United States Patent
Kucharczyk

(10) Patent No.: US 6,913,398 B2
(45) Date of Patent: Jul. 5, 2005

(54) FRAME FOR A FIBER OPTIC TAPER

(75) Inventor: Damian Kucharczyk, Wroclaw (PL)

(73) Assignee: Oxford Diffraction Ltd, Oxfordshire (GB)

( * ) Notice: Subject to any disclaimer, the term of this patent is extended or adjusted under 35 U.S.C. 154(b) by 160 days.

(21) Appl. No.: 10/217,830

(22) Filed: Aug. 12, 2002

(65) Prior Publication Data

US 2004/0028347 A1 Feb. 12, 2004

(51) Int. Cl.$^7$ ............................................. G02B 6/36
(52) U.S. Cl. ...................... 385/88; 385/94; 385/89; 385/90; 385/91; 385/92; 385/93; 385/14; 385/49; 385/53; 250/239; 250/216
(58) Field of Search ................ 385/88, 94, 89, 385/90, 91, 92, 93, 14, 49, 53; 250/239, 216

(56) References Cited

U.S. PATENT DOCUMENTS

| | | | | |
|---|---|---|---|---|
| 4,410,469 A | * | 10/1983 | Katagiri et al. | ............ 264/1.25 |
| 4,699,455 A | * | 10/1987 | Erbe et al. | ..................... 385/89 |
| 6,152,610 A | * | 11/2000 | Hattori | ........................ 385/88 |
| 6,239,427 B1 | * | 5/2001 | Mizue | ........................ 250/239 |

* cited by examiner

Primary Examiner—Dean A. Reichard
Assistant Examiner—Anton Harris
(74) Attorney, Agent, or Firm—Kenyon & Kenyon

(57) ABSTRACT

In the present invention, a frame for mounting a fiber optic taper and a CCD chip in optical contact comprises a resilient support for supporting the fiber optic taper adjacent the CCD chip, means for lowering the fiber optic taper towards the CCD chip and means for applying pressure to urge the fiber optic taper onto the CCD chip. The weight of the fiber optic taper is supported by the resilient support as it is lowered into contact with the chip. Once in engagement with the CCD chip, the fiber optic taper can be pressed against the CCD chip to provide a positive pressure in excess of that due to its weight. As the support is resilient, it provides resistance to the positive pressure, thereby preventing the pressure on the CCD chip from becoming great enough to cause damage to the fragile CCD chip.

21 Claims, 2 Drawing Sheets

FRAME FOR A FIBER OPTIC TAPER

FIELD OF THE INVENTION

The present invention relates to a mechanical frame designed for application in detectors based on charged coupled device (CCD) technology, particularly for use in x-ray detectors. In such detectors, a glass fibre optic taper is mounted in optical contact with a CCD chip which is mounted on a Peltier cooling device.

BACKGROUND TO THE INVENTION

CCD chips used in x-ray detectors are typically fragile and extremely expensive. It is necessary to manoeuvre a very heavy glass fibre optic taper into precise position and optical contact with the CCD chip, and finally to maintain contact between the fibre optic taper and the CCD chip under conditions of constant and uniform positive pressure. Typically, the fibre optic taper is lowered onto the surface of a CCD chip which is mounted on a Peltier cooler. This is an extremely difficult and delicate operation, and due to the heavy weight of the fibre optic taper and the fragile nature of the CCD chip, it is not unusual for chips to be broken during the operation. Typically, one in five chips are damaged or broken during assembly of detector devices. Because the chips are extremely expensive devices, it is clearly desirable to provide an improved method and apparatus for mounting the fibre optic taper and the CCD chip in optical contact. It is also desirable to provide a construction which is flexible enough to provide resistance to forces resulting from changes in thermal conditions, velocity and motion shocks once the device is assembled.

A further problem with prior art mounting arrangements is that glue is often used to maintain optical contact between the fibre optic taper and the CCD chip, and it is difficult to avoid the formation of bubbles in the glue which adversely effect the optical coupling between the fibre optic taper and the CCD chip.

Once the fibre optic taper has been accurately located and securely attached relative to the CCD chip, the whole assembly is often tilted for direct use or for incorporation into a larger piece of equipment. It is therefore important that the weight of the fibre optic taper is supported whilst maintaining contact between the fibre optic taper and the CCD chip under conditions of constant and uniform positive pressure. This is particularly true where the whole assembly is rotated by 90° for use in a horizontal orientation.

SUMMARY OF THE INVENTION

According to the present invention, a frame for mounting a fibre optic taper and a CCD chip in optical contact comprises:

a resilient support for supporting the fibre optic taper adjacent the CCD chip;

means for lowering the fibre optic taper towards the CCD chip; and means for applying pressure to urge the fibre optic taper onto the CCD chip.

In the device of the present invention, the resilient support supports the weight of the fibre optic taper as it is lowered into contact with the chip. When the fibre optic taper first comes into contact with the CCD chip, the resilient support means are weakly held under strain by the weight of the fibre optic taper. The strain in the resilient support means is released slowly, such that the weight of the fibre optic taper is applied gradually to the CCD chip.

Once the fibre optic taper is in engagement with the CCD chip, it can be pressed against the CCD chip to provide a positive pressure in excess of that due to the weight of the fibre optic taper. As the support is resilient, it provides resistance when the positive pressure is applied. Thus the resilient support partially absorbs the pressure and prevents the pressure on the CCD chip from becoming too great, thereby protecting the fragile CCD chip.

Preferably, the support comprises a resilient ring supporting the fibre optic taper at support points; and means for lowering the fibre optic taper by lowering the resilient ring at lowering points which are not coincident with the support points.

Preferably, the frame further includes means for depressing the resilient ring at depression points not coincident with the support points. This allows the positive pressure to be applied to urge the taper into contact with the chip. Preferably, the lowering points and the depression points are coincident.

Preferably, the means for lowering the resilient ring and the means for depressing the resilient ring comprises at least one threaded rod passing through the body of the resilient ring, and having a first nut threaded onto the rod below the resilient ring and a second nut threaded onto the rod above the resilient ring. The first nut below the resilient ring acts as the means for lowering the ring, as the ring and the weight of the taper is supported on the first nut, and by screwing the nut downwards, the ring and the taper are lowered. When the optical taper touches the face of the CCD chip, further release of the first nut releases any residual strain in the resilient ring. Once the strain in the resilient ring is completely released, the second nut can be screwed down on top of the resilient ring. This causes positive pressure to be applied by the optical taper, in excess of that due to its weight, pressing the optical taper into contact with the CCD chip. Under the applied pressure, the resilient ring flexes so as to partially resist the applied pressure and thereby protect the fragile CCD chip from excessive pressure.

Preferably, a plurality of rods are circumferentially spaced around the resilient ring. Each rod has nuts threaded above and below the resilient ring for lowering and depressing the ring. All the nuts are independently adjustable. The support points are located between the rods, preferably located midway between adjacent rods around the circumference of the ring. Preferably, there are three rods and three support points located at 60° to the rods. More preferably, there are four rods and four support points located at 45° to the rods.

Preferably, a support point includes a bolt. Preferably, the bolt is securely connected to the resilient ring.

In order for depression of the resilient ring to transmit a positive pressure to urge the taper into contact with the chip, it is preferred that the frame includes means for connecting the resilient support to the fibre optic taper.

Preferably, the connection means includes at least one screw which can be turned so as to penetrate into the surface of the fibre optic taper. Preferably, the connection means includes at least one of the bolts.

Preferably, the frame includes means for aligning the CCD chip with the base of the optical taper as the optical taper is lowered towards the CCD chip.

Preferably, the alignment means comprises a locating section which is connected to the resilient ring and which is adjustable in the horizontal plane to locate the chip at the base of the fibre optic taper as the fibre optic taper is lowered.

Preferably, the alignment means further comprises a plurality of guide pins.

Preferably, the guide pins have arcuate tips.

As the assembled frame and fibre optic taper may be tilted in use, it is preferred that the frame further comprises means for supporting a component of the taper's weight perpendicular to the axis of the fibre. The supporting means reduces any sideways force that would encourage the separation of the fibre optic taper from the CCD chip. The component of the taper's weight along the axis of the fibre will continue to contribute to the pressure exerted by the taper on the CCD chip. If the assembly is rotated to the horizontal the supporting means will take substantially the whole weight of the taper but, due to the pressure applying means, a uniform positive pressure will still be applied urging the taper onto the CCD chip even in the absence of the taper's weight.

Preferably, the supporting means comprises the top end of a rod. Preferably, the top end of the rod has a pseudo-spherical head. This ensures a small area of contact which can readily adjust according to the orientation of the assembly.

In order to reduce sensitivity to variations in temperature, it is preferred that the frame is substantially thermally isolated from the fibre optic taper and CCD chip.

According to another aspect of the present invention, a method for assembling a fibre optic taper in optical contact with a CCD chip comprises the steps:

mounting the fibre optic taper adjacent the CCD chip within a frame;

moving the fibre optic taper towards the CCD chip until they contact; and, applying a positive pressure to urge the fibre optic taper onto the CCD chip.

Preferably, the pressure is applied uniformly across the CCD chip.

As the application of excessive positive pressure may damage the fragile CCD chip, it is preferred that the applied positive pressure is partially resisted by a resilient means to prevent such damage.

Preferably, the positive pressure is applied by turning a nut on a threaded rod.

In order to protect the optical surfaces of the CCD chip and the fibre optic taper on contact, it is preferred that the surface of the CCD chip is prepared with a laser oil.

Preferably, the step of applying a positive pressure onto the CCD chip includes the sub-step of removing air bubbles from the laser oil sandwiched between the surfaces of the CCD chip and fibre optic taper.

In order to ensure good optical coupling between the fibre optic taper and the CCD chip, it is preferred that the method of assembly further comprises the step of aligning the CCD chip with the base of the fibre optic taper as the fibre optic taper is lowered onto the CCD chip.

As the fibre optic taper and CCD chip assembled within the frame may be used in a non-vertical orientation, it is preferred that the method of assembly further comprises the step of supporting a component of the tapers weight perpendicular to the axis of the fibre so as to discourage separation of the fibre optic taper from the CCD chip.

BRIEF DESCRIPTION OF THE DRAWINGS

An example of the present invention will now be described in detail with reference to the accompanying drawings, in which.

DETAILED DESCRIPTION

Figure 1:
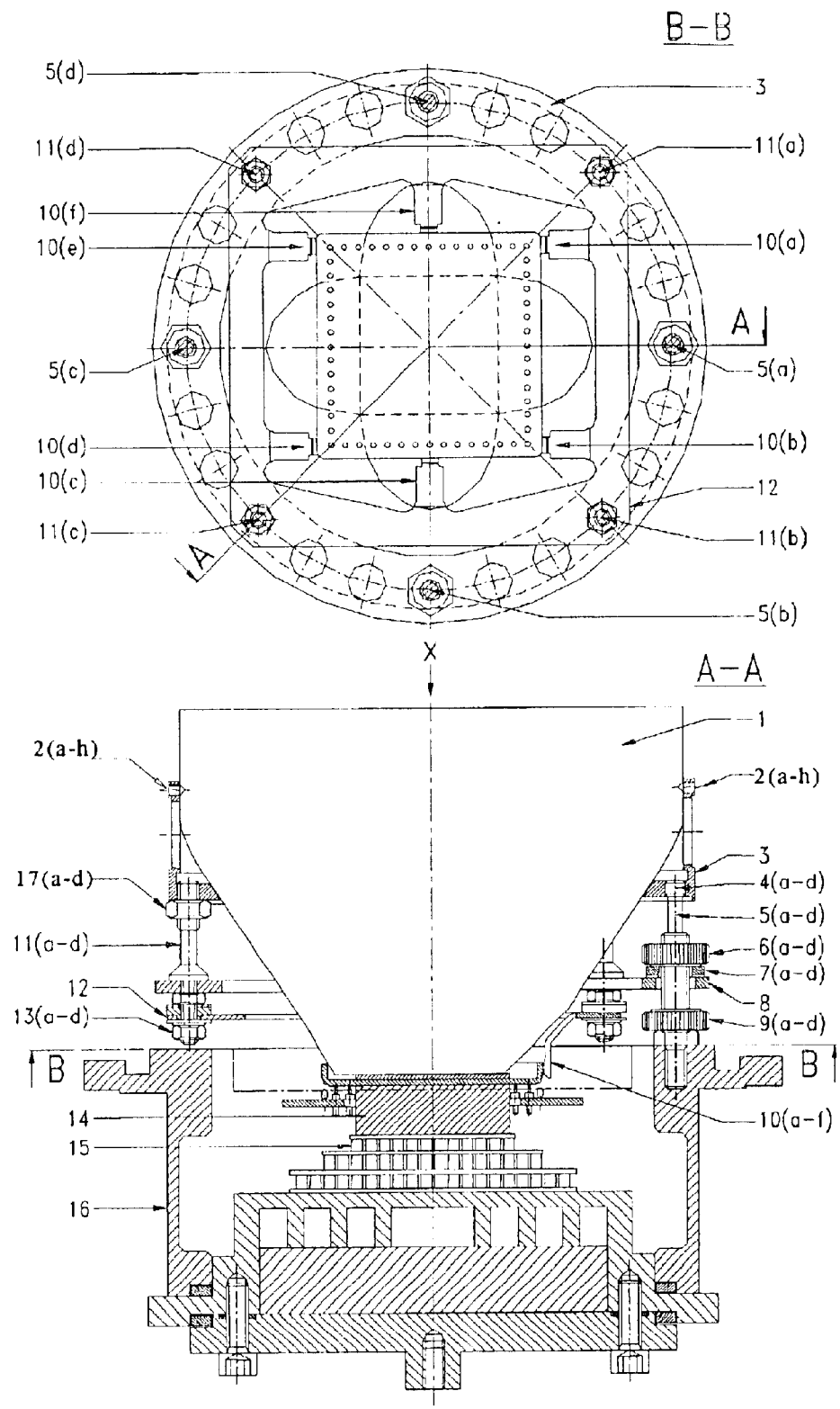
FIG. 1 shows (above) a plan view of a frame and (below) a cross section through two different radial directions of an assembly including the frame, according to the present invention; and, FIGS. 2A, 2B and 2C show simplified diametrical cross sections of an assembly including the frame according to the present invention, illustrating the lowering and application of pressure to a fibre optic taper mounted in the frame.

The frame consists of an outer steel ring 3 and lower steel rectangle 12 with a second resilient steel ring 8 located between the outer steel ring 3 and the lower steel rectangle 12. This arrangement is shown in the plan view (cross section B—B) of FIG. 1. The relative spacings of outer steel ring 3, second resilient steel ring 8, and lower steel rectangle 12 are better illustrated in the side view (cross section A—A) of the assembly shown in the lower part of FIG. 1. The outer steel ring 3 is secured to the inner flexible steel ring 8 by four threaded steel bolts 11a to 11d which are located at 90° from each other around the steel ring 3 and secured in place by a screw nut 17a to 17d. The screws 17a to 17d are tightened to put pressure on the upper steel ring 3. The threaded bolts 11a to 11d extend from the upper ring 3 through the flexible steel ring 8 down through the lower steel rectangle 12 and terminate in screw threads with steel nuts 13a to 13d. This configuration is illustrated on the left hand side of cross section A—A shown in FIG. 1.

The lower part of the frame comprises a stage 16 on which is located a Peltier cooling pyramid 15. In use, a CCD chip 14 is mounted on top of the Peltier cooling pyramid 15, and a fibre optic taper 1 is inserted into the frame through the aperture X. The weight of the fibre optic taper 1 is supported via the outer steel ring 3, second resilient steel ring 8, and lower steel rectangle 12. The second resilient steel ring 8, which is connected to the lower steel rectangle 12, may be supported by four nuts 9a to 9d which are threaded onto four rods 5a to 5d positioned at 90° to each other and which pass through the second resilient steel ring 8. The right hand side of cross section A—A in FIG. 1, which is along a radial direction at 45° to that shown on the left hand side, illustrates this arrangement of components. At the lower end, the rods 5a to 5d are secured to the stage 16. At the upper end they are topped by metal spheres 4a to 4d. The metal spheres lie within the thickness of the outer steel ring 3, with sufficient room to allow movement of the ring 3 around the spheres 4a to 4d as the taper is lowered or raised. The outer steel ring 3 is connected to the fibre optic taper 1 by its cut away steel rim, which is secured into position by eight screws 2a to 2h that are screwed through the frame and penetrate into the surface of the fibre optic taper 1.

Figure 2A:
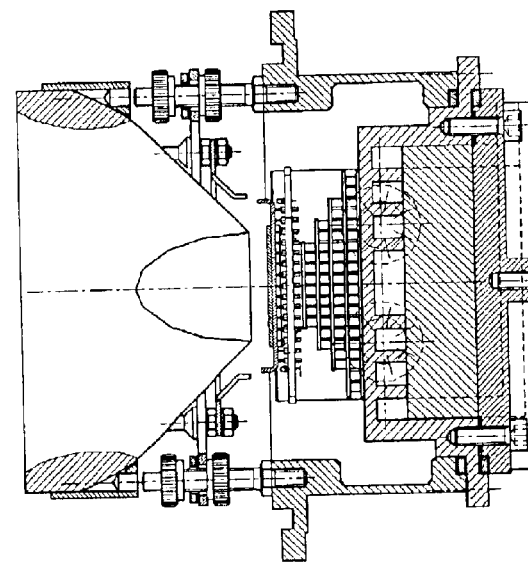
Figure 2B:
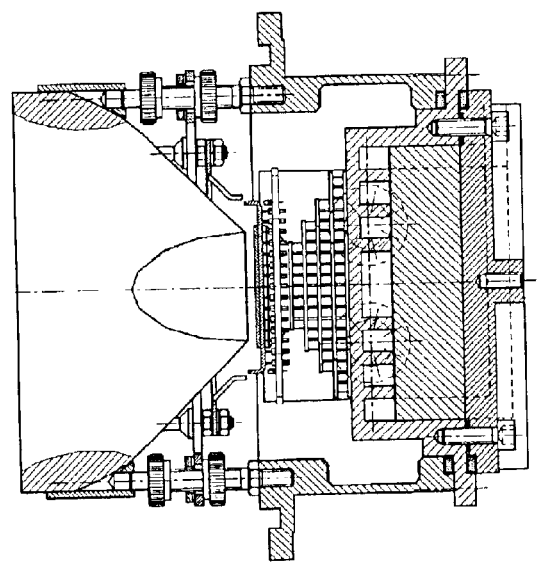

Initially, the weight of the fibre optic taper 1 is supported through the rods 11a to 11d, the flexible ring 8, and rests on the nuts 9a to 9d. This is shown in the diametrical cross section of FIG. 2A. The weight of the fibre optic taper 1 causes the ring 8 to flex very slightly. Adjusting the screw nuts 9a to 9d allows the position of the fibre optic taper 1 to be lowered or raised. The diametrical cross section of FIG. 2B shows the assembly with the fibre optic taper 1 lowered relative to that shown in FIG. 2A, but not yet in contact with the CCD chip 14. Each of the screw nuts 9a to 9d is independent and can be adjusted individually or as a group in order to tilt the fibre optic taper 1 in any direction.

As the taper 1 is lowered into position on the CCD chip 14, six curved guide pins 10a to 10f mounted on the underside of the steel rectangle 12 direct the CCD chip 14 into position approximately 5 mm below the bottom surface of the fibre optic taper 1. The tips of the curved guide pins 10a to 10f are slightly arcuate in cross section in the direction of the CCD chip 14. The use of arcuate tips serves to reduce friction between the CCD chip 14 and the guide pins 10a to 10f, and also to prevent the CCD chip 14 from becoming wedged or locked between two or more of the guide pins. Without this feature, there is a possibility of damage to the edge of the CCD chip 14 or even fracture of the chip. On the underside of the steel rectangle 12 are four screw nuts 13a to 13d. Loosening these screw nuts 13a to 13d allows the steel rectangle 12 to traverse in the horizontal plane. Viewing the CCD chip 14 through the top of the fibre optic taper 1, the CCD chip 14 can be positioned on the centre of the fibre optic taper 1 using this transverse slide, and finally locked into position by tightening the screw nuts 13a to 13d.

The surface of the CCD chip 14 has been prepared with two to three drops of laser optic oil. Unscrewing the screw nuts 9a to 9d now lowers the fibre optic taper 1 towards the surface of the CCD chip 14. Once the end face of the fibre optic taper 1 is in contact with the CCD chip 14, further downward adjustment of screws 9a to 9d releases any residual strain in the flexible ring 8, which in turn causes the full weight of the optical traper 1 to slowly be brought to bear on the CCD chip 14. Air bubbles in the laser optic oil can be worked to the edge of the chip 14 and out of the oil adjusting the screw nuts 9a to 9d up and down. Once all the air bubbles have been removed and the CCD chip 14 is accurately positioned, the screw nuts 9a to 9d can be completely unscrewed so that they reside at the base of the support rods 5a to 3d, away from the mechanical frame, thus removing added surface area for transmission of heat. This position is illustrated in FIG. 20 and also in cross section A—A of FIG. 1. At this point, the weight of the fibre optic taper 1 is entirely placed on the CCD chip 14 and the fibre optic taper 1 is now floating on the surface of the CCD chip 14.

Figure 2C:
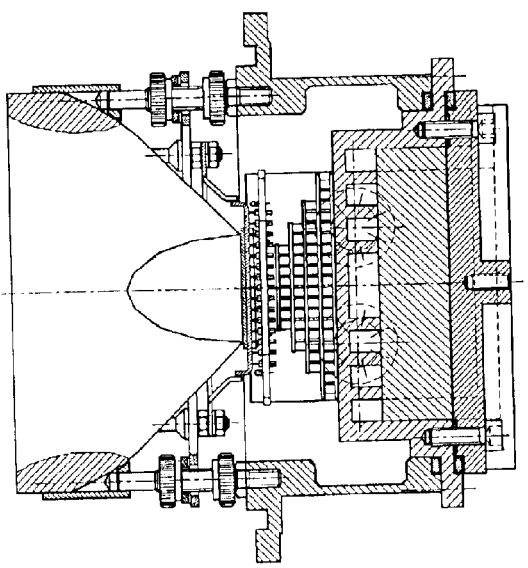

Screwing down the screw nuts 6a to 6d places a positive pressure from the fibre optic taper 1 onto the CCD chip 14. This situation is illustrated in FIG. 2C and also in cross section A—A of FIG. 1. By adjusting the four screw nuts 6a to 6d, a uniform and constant positive pressure can be applied to the surface of CCD chip 14. As the screw nuts 6a to 6d are screwed downwards the resilient ring 8 flexes, thereby applying a resisting force which prevents too great a pressure being applied to the CCD chip 14. CCD chips, especially back illuminated versions are very fragile and as the positive pressure of the fibre optic taper 1 increases there is a risk of fracture. This positive pressure is prevented from becoming too great by the flexible steel ring 8 which is caused to deflect and thus the fibre optic taper 1 cannot be lowered sufficiently far onto the CCD chip 14 to cause fracture. The smooth application of pressure is assisted by washers 7a to 7d, which prevent direct contact between the screw nuts 6a to 6d and the flexible steel ring 8.

Once the fibre optic taper has been accurately aligned in the frame so as to impinge uniformly onto the CCD chip, the whole assembly is robust enough to be tilted, for stand alone use or for incorporation into a larger test rig. It is often the case that the whole assembly is rotated by 90° for use in a horizontal orientation. In this arrangement there will be no contribution to the pressure on the CCD chip arising from the weight of the fibre optic taper. Indeed, the weight of the taper may encourage it to separate from the CCD chip. Therefore, it is necessary that there is a mechanism to support the weight of the taper within the frame at orientations other than the vertical.

In the present invention, this support is provided by the four rods 5a to 5d secured to the stage 16, with the metal spheres 4a to 4d providing a small surface area contact point with an overall shape that is suited to any desired orientation of the frame. There is sufficient clearance within the thickness of the outer steel ring 3 to allow the ring to move around the spherical heads 4a to 4d as the taper is lowered, but still to encompass them. In this way, at least part of the weight of the taper will be supported by the steel ring 3 resting on spheres 4a to 4d when the assembly is inclined to the vertical. At the same time, a uniform pressure will be maintained on the CCD chip via the screw nuts 6a to 6d impinging on the flexible steel ring 8.

As optimum running of a CCD device requires cooling of the CCD chip in the range −40° C. to −50° C., thermal considerations are also a key factor in the design of a suitable mounting frame. As shown in FIG. 1, CCD chip cooling is typically achieved via Peltier cooling. In order to maintain optimal operating temperature of the CCD chip 14, the CCD mechanical frame of the present invention has been designed to minimise heat transfer from the outer surface of the device's body. These designed heat reduction measures include the cut away construction of the steel rings 3 and 8, the low cross section of the rods 5a to 5d and 11a to 11d, and the epoxy laminate washers 7a to 7d, which are flat on one side and have only four points of contact on the underside between the nuts 6a to 6d and the steel ring 8. Also, the pseudo-spherical heads located on the rods 5a to 5d reduce indirect heat transfer passed from body surface to fibre optic taper and CCD chip.

What is claimed is:

1. A unitary frame for mounting a fibre optic taper and a charge coupled device (CCD) chip in optical contact comprising:

means for resiliently supporting the fibre optic taper adjacent the CCD chip;

means for lowering the fibre optic taper towards the CCD chip; and means for applying pressure to urge an optical surface of the fibre optic taper onto an optical surface of the CCD chip, wherein the means for resiliently supporting the fibre optic taper resists pressure applied to the optical surface of the CCD chip by the optical surface of the fibre optic taper.

2. A frame according to claim 1, in which the resiliently supporting means comprises a resilient ring for supporting the fibre optic taper at support points, and means for lowering the fibre optic taper by lowering the resilient ring at lowering points which are not coincident with the support points.

3. A frame according to claim 2, further comprising means for depressing the resilient ring at depression points not coincident with the support points.

4. A frame according to claim 3, in which the lowering points and the depression points are coincident.

5. A frame according to claim 2, in which the means for lowering the resilient ring and the means for depressing the resilient ring comprises at least one threaded rod passing through the body of the resilient ring, and having a first nut threaded onto the rod below the resilient ring and a second nut threaded onto the rod above the resilient ring.

6. A frame comprising a plurality of rods according to claim 5, said rods circumferentially spaced around the resilient ring.

7. A frame according to claim 6, in which three rods are located at 60° to three support points.

8. A frame according to claim 6, in which four rods are located at 45° to four support points.

9. A frame according to claim 2, in which a support point includes a bolt.

10. A frame according to claim 9, in which the bolt is securely connected to the resilient ring.

11. A frame according to claim 1, further comprising means for connecting the resilient support to the fibre optic taper.

12. A frame according to claim 11, in which the connection means includes at least one screw which can be turned so as to penetrate into the surface of the fibre optic taper.

13. A frame according to claim 11, in which the connection means includes at least one bolt.

14. A frame according to claim 1, further comprising means for aligning the CCD chip with the base of the optical taper as the optical taper is lowered towards the CCD chip.

15. A frame according to claim 14, in which the alignment means comprises a locating section which is connected to the resilient ring and which is adjustable in the horizontal plane to locate the chip at the base of the fibre optic taper as the fibre optic taper is lowered.

16. A frame according to claim 14, in which the alignment means further comprises a plurality of guide pins.

17. A frame according to claim 16, in which the guide pins have arcuate tips.

18. A frame according to claim 1, further comprising means for supporting a component of the taper's weight perpendicular to the axis of the fibre.

19. A frame according to claim 18, in which the supporting means comprises a top end of a rod.

20. A frame according to claim 19, in which the top end of the rod has a pseudo-spherical head.

21. A frame according to claim 1, wherein the frame is substantially thermally isolated from the fibre optic taper and CCD chip.

* * * * *